United States Patent [19]

Miller, Jr. et al.

[11] Patent Number: 5,363,952
[45] Date of Patent: Nov. 15, 1994

[54] HIGH TEMPERATURE TRANSPORT BELT FOR MATERIALS TREATING FURNACE

[75] Inventors: Charles W. Miller, Jr., Goffstown; John Currier, Belmont; Larry Duclos, Epsom; Thomas Ayer, Allenstown, all of N.H.

[73] Assignee: Centorr/Vacuum Industries, Inc., Nashua, N.H.

[21] Appl. No.: 119,709

[22] Filed: Sep. 10, 1993

[51] Int. Cl.$^5$ ............................................. B65G 15/54
[52] U.S. Cl. .................................................... 198/848
[58] Field of Search .............. 198/848, 850; 110/269; 432/140

[56] References Cited

U.S. PATENT DOCUMENTS

| | | | |
|---|---|---|---|
| 2,657,788 | 11/1953 | Merrill | 198/848 |
| 2,674,424 | 4/1954 | Gier, Jr. | 198/848 X |
| 3,542,188 | 11/1970 | Kinney, Jr. | 198/848 |

FOREIGN PATENT DOCUMENTS

| | | | |
|---|---|---|---|
| 0338951 | 11/1930 | United Kingdom | 198/848 |
| 0521284 | 5/1940 | United Kingdom | 198/848 |
| 2051154 | 1/1981 | United Kingdom | 198/848 |

OTHER PUBLICATIONS

Cambridge Conveyor Belts for the Conveying and Treatment of Industrial Products, 1941.

*Primary Examiner*—James R. Bidwell
*Attorney, Agent, or Firm*—Henry D. Pahl, Jr.

[57] ABSTRACT

In a materials treating furnace, a belt is provided for transporting articles to be treated through a high temperature treatment zone. The belt comprises a succession of interwoven links, each of which is made up of a length of tungsten wire which has been heated and wound around an elliptical mandrel to provide a link which is in the form of a slightly flattened helix having no sharp bends. The interweaving of the helical links provides a large number of interlocking contact points between successive links.

6 Claims, 2 Drawing Sheets

HIGH TEMPERATURE TRANSPORT BELT FOR MATERIALS TREATING FURNACE

BACKGROUND OF THE INVENTION

The present invention relates to the heat treatment of materials in a furnace and more particularly to an improved tungsten wire belt for transporting articles to be treated through a heat treating zone.

As is understood, various articles can be advantageously treated by being subjected to high temperature for a preselected period of time. Such treatment may for example, effect sintering of articles made by compacting powdered refractory metals or ceramics. Further, in some processes it is desirable that the articles be transported through a heat treating zone in a furnace rather than being loaded and unloaded in batches.

Conventionally, articles have been transported through a heating zones on link belts made up of wire formed as conventional belt links such as illustrated in FIGS. 2 and 3. However, even when fabricated of a refractory metal such as tungsten, such conventional belts have been shown to be relatively frail and have been limited to a maximum use temperature of 2000° C. and light loads, e.g., one ounce per square inch.

Among the several objects of the present invention may be noted the provision of novel heat treating apparatus; the provision of such apparatus which provides heat treatment at temperatures in the order of 1200°–2200° C.; the provision of such apparatus in which articles may be transported through a heating zone on a flexible belt; the provision of such apparatus employing a belt which is not subject to failure; the provision of such a belt which will withstand substantial loading; the provision of such a belt which is highly reliable and which is of relatively simple and inexpensive construction. Other objects and features will be in part apparent and in part pointed out hereinafter.

SUMMARY OF THE INVENTION

A belt constructed in accordance with the present invention is useful in transporting articles to be treated through the heat treating zone of a materials treating furnace providing a treatment temperature in the order of 1200°–2200° C. The belt is made up of a succession of interwoven links each of which is formed of a length of tungsten wire which has been heated to a temperature of at least 400° C. and wound around an elliptical mandrel to provide, when cooled, a link which is in the form of a slightly flattened helix. It is believed that, by the avoidance of sharp bends in the link form and by the provision of a large number of interlocking contact points between links, greatly improved strength and failure resistance are obtained.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
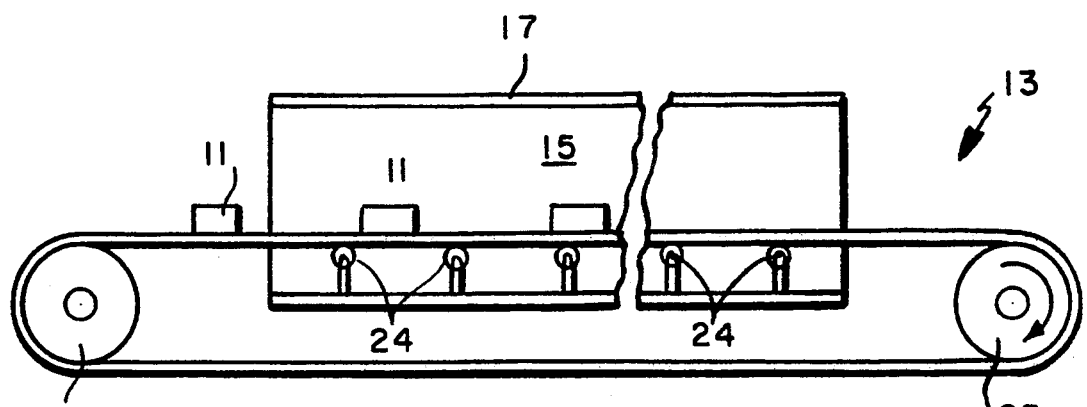
FIG. 1 is a diagrammatic side view of a materials treating furnace utilizing a belt for transporting articles to be treated through the heating zone of the furnace.

Referring now to FIG. 1, there is illustrated a materials treating furnace of the type in which articles to be treated are transported through a heating zone on a belt 13. The heating zone, designated generally by reference character 15, is formed inside a tunnel enclosure 17, heat being generated by suitable electric resistance heating elements or induction heating coils, not shown.

The belt 13 is preferably continuous and, at either end of the heating tunnel 17, passes over suitable rollers 21 and 25. One or both of the rollers may be driven by suitable motor means, not shown, to effect steady or intermittent movement of the belt so that the articles to be treated remain within the heating zone for a preselectable time. Within the heating zone 15, the belt 13 is preferably supported by roller assemblies 24 which are described in greater detail hereinafter. A furnace of the type illustrated is desirable for the processing of ceramics such as Silicon Nitride, Aluminum Nitride and Silicon Carbide. The furnace facilitates rapid rate sintering and uniformity of treatment on production quantities. Using the belt construction of the present invention permits advantageously higher temperatures to be utilized.

Figure 2:
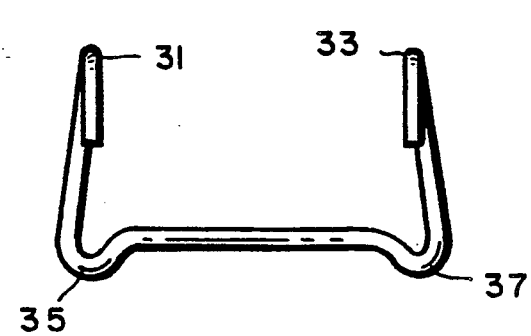
FIGS. 2 and 3 are a plan view and a side view respectively of a prior art form of belt link.
Figure 3:
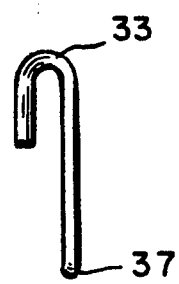

Prior art furnaces of the general type illustrated in FIG. 1 utilized belts made up of links fashioned in a conventional form as illustrated in FIGS. 2 and 3. As may be seen, each link of the type illustrated in FIGS. 2 and 3 involves a pair of sharply bent or formed hook members 31 and 33 respectively which, in forming a continuous belt, are bent around mating portions, designated by reference characters 35 and 37 in the next link in the belt. These mating portions 35 and 37 also involve relatively sharply bent portions of the wire making up the link. When employed at high temperatures, i.e., temperatures in the order of 1200°–2000° C., these prior art belt links as shown in FIGS. 2 and 3 were subject to frequently failure if at all heavily loaded by the articles being treated.

Figure 4:
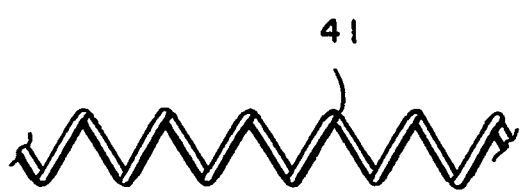
FIG. 4 is a top view of a belt link in accordance with the present invention.
Figure 5:
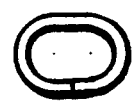
FIG. 5 is a side or end view of the link of FIG. 4.
Figure 7:
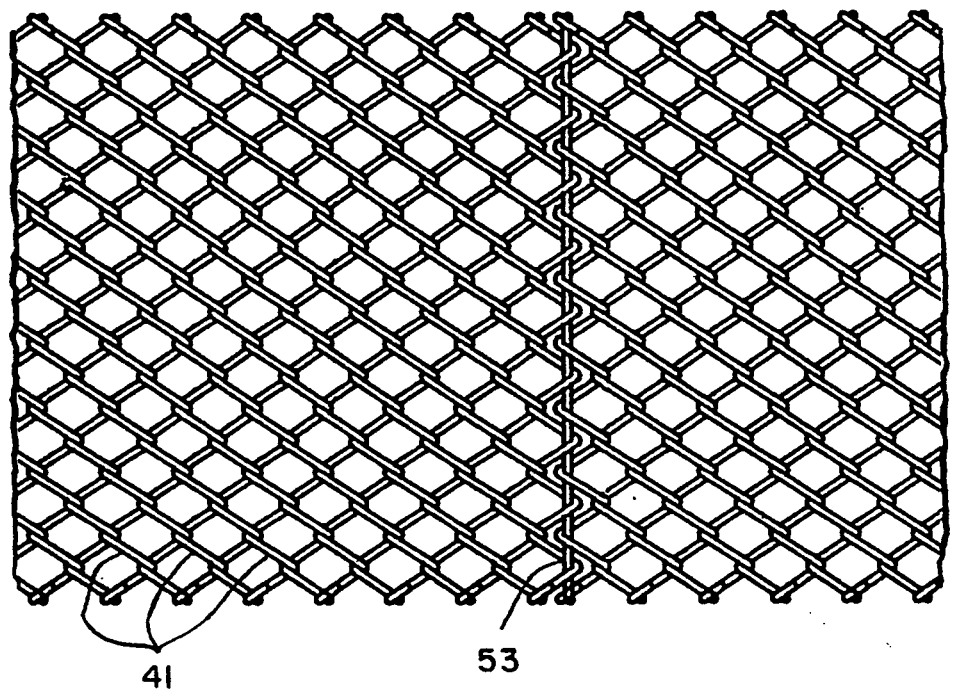
FIG. 7 is a top view of a length of high temperature transport belt constructed in accordance with the present invention.

In contrast with the links in the prior art, a belt constructed in accordance with the present invention is made up of a succession of interwoven links, each of which is in the form of slightly flattened helix having no sharp bends. A single such helix is illustrated in FIGS. 4 and 5, the helix being designated by reference character 41, while a length of belting made up of a succession of links 41 interwound each with the next is illustrated in FIG. 7. The interweaving of the helical links provides a large number of interlocking contact points between successive links. This makes the belt effectively tougher and less prone to catastrophic failure caused by breakage at a single contact point.

Figure 6:
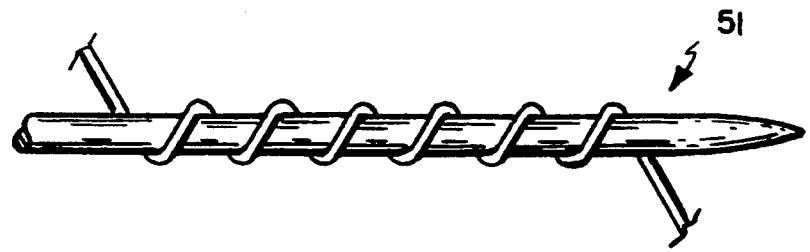
FIG. 6 illustrates the forming of the link of FIGS. 4 and 5 by winding heated tungsten wire over a mandrel.
Figure 8:
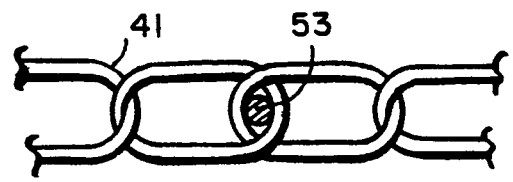
FIG. 8 is a side view of the section of the belt of FIG. 7.

A helical link as shown in FIGS. 4 and 5 can conveniently be fabricated by heating tungsten wire of an appropriate gauge, e.g., 18 gauge to a temperature which renders the tungsten malleable to bending, e.g., a temperature in the range of 400°–600° C. and then winding the wire at an appropriate pitch angle around an elliptical mandrel 51 as illustrated in FIG. 6. After cooling, the wound tungsten wire forms a link which, over a majority of its length, is in the form of a slightly flattened helix having no sharp bends. To form the belt of FIGS. 7 and 8, each successive link can be wound into a preceding link and the ends of the links can be bent over each other, as illustrated. The flexibility of the resultant belt is quite high since the junction between every other one of the links is essentially unrestrained, even by the end terminations. Further, apparently from the avoidance of sharp bends, particularly at the points where adjacent links connect with each other, stress concentrations and failures at high temperatures are markedly reduced. Similarly, the large number of interlocking contact points between successive links reduces the chance of catastrophic failure, as noted previously.

One method of assembling a length of belting into the furnace of FIG. 1 is by threading the last helical link into the two otherwise end-most links of a length of belting after the length has been put in place, passing over the rollers 21 and 23. Another method of assembling is to merely interlace the end-most links of a length of belting and insert a pin or length of tungsten wire as indicated at reference character 53 in FIG. 7. The ends of the pin 53 can be heated and bent over in the same manner as the ends of the links themselves or the pin can be threaded and endwise movement can be captivated by tungsten nuts. Further, if it is desired to minimize tendency of the belting to creep to one side or the other, alternating lengths of right hand wound and left hand wound sets of helical lengths can be connected, using the same method of pinning.

Figures 9, 10:
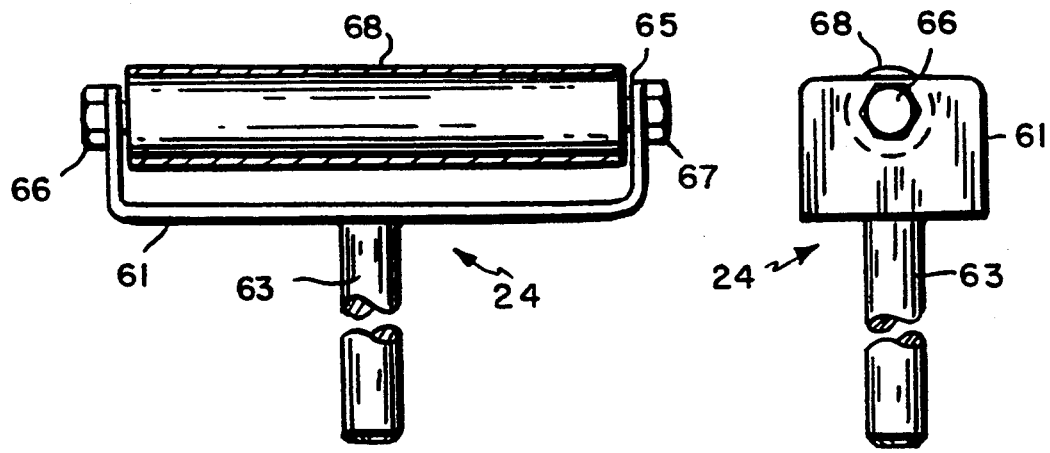
FIG. 9 is a front view of a support roller assembly used in the furnace of FIG. 1.
FIG. 10 is an end view of the roller assembly of FIG. 9.

As noted previously, the belt 13 is preferably supported with the heating zone 15 by roller assemblies 24. A preferred form of roller assembly is illustrated in FIGS. 9 and 10. A U-shaped bracket 61 mounted on a central post 63 carries a roller shaft 65. Shaft 65 is preferred constituted by a tungsten wire round rod as is conventional in the high temperature arts, so as to provide an exteriorly threaded surface. This construction is used since tungsten is difficult to machine, e.g., for the forming of threads. The shaft 65 is captivated in the bracket by the tungsten nuts 66 and 67. Surrounding the central portion of the rod 65 is a tube or sleeve 68 constructed of synthetic sapphire. As is understood, the synthetic sapphire material is highly refractory and does not tend to stick to tungsten at the high temperatures contemplated. For a wider belt multiple roller assemblies may be used across the width of the heating zone.

In view of the foregoing it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

What is claimed is:

1. In a materials treating furnace producing, a heat treating zone, a treatment temperature in the order of 1200°–2200° C., a belt for transporting articles to be treated through said zone; said belt comprising;
    a succession of interwoven links, the interweaving providing a multiplicity of interlocking contract points, each link comprising a length of tungsten wire which has been heated to a temperature of at least 400° C. and wound around an elliptical mandrel to provide, when cooled, a link which over the majority of its length, is in the form of a slightly flattened helix having no sharp bends.

2. In a materials treating furnace with a transport belt as set forth in claim 1 further comprising a series of rollers supporting said belt as it passes through said zone.

3. In a materials treating furnace with a transport belt as set forth in claim 2 wherein said belt comprises a fist succession of links which are right hand wound and a second succession of links which are left hand wound, the two successions being joined by a pin which passes through turns of the endmost links of each succession.

4. A materials treating furnace comprising:
    means for defining a heat treating zone providing a treatment temperature in the order of 1200°–2200° C., a belt for transporting articles to be treated through said zone; said belt being formed of a succession of interwoven links, each link comprising a length of tungsten wire which has been heated to a temperature of at least 400° C. and wound around an elliptical mandrel to provide, when cooled, a link which over the majority of its length, is in the form of a slightly flattened helix having no sharp bends, the interweaving providing a multiplicity of interlocking contact points; and
    a succession of rollers supporting said belt within said zone, said rollers comprising tubes of synthetic sapphire supported on tungsten shafts.

5. In a materials treating furnace producing, a heat treating zone, a treatment temperature in the order of 1200°–2200° C., a belt for transporting articles to be treated through said zone; said belt comprising;
    a succession of interwoven links, each link comprising a length of tungsten wire which has been heated to a temperature of at least 400° C. and wound around an elliptical mandrel to provide, when cooled, a link which over the majority of its length, is in the form of a slightly flattened helix having no sharp bends; and
    a series of rollers supporting said belt as it passes through said zone, said rollers comprising tubes of synthetic sapphire.

6. In a materials treating furnace producing, a heat treating zone, a treatment temperature in the order of 1200°–2200° C., a belt for transporting articles to be treated through said zone; said belt comprising;
    a succession of interwoven links, each link comprising a length of tungsten wire which has been heated to a temperature of at least 400° C. and wound around an elliptical mandrel to provide, when cooled, a link which over the majority of its length, is in the form of a slightly flattened helix having no sharp bends;
    a series of rollers supporting said belt as it passes through said zone, said rollers comprising tubes of a highly refractory material; and
    supporting said rollers, shafts comprising tungsten wire round rod.

* * * * *